(12) United States Patent
Oda et al.

(10) Patent No.: US 8,358,892 B2
(45) Date of Patent: Jan. 22, 2013

(54) CONNECTION STRUCTURE OF TWO-DIMENSIONAL ARRAY OPTICAL ELEMENT AND OPTICAL CIRCUIT

(75) Inventors: Mikio Oda, Minato-ku (JP); Hikaru Kouta, Minato-ku (JP); Kaichirou Nakano, Minato-ku (JP); Hisaya Takahashi, Minato-ku (JP); Kohroh Kobayashi, Meguro-ku (JP)

(73) Assignees: NEC Corporation, Tokyo (JP); Tokyo Institute of Technology, Tokyo (JP)

( * ) Notice: Subject to any disclaimer, the term of this patent is extended or adjusted under 35 U.S.C. 154(b) by 117 days.

(21) Appl. No.: 11/817,297

(22) PCT Filed: Feb. 28, 2006

(86) PCT No.: PCT/JP2006/303685
§ 371 (c)(1),
(2), (4) Date: Oct. 3, 2007

(87) PCT Pub. No.: WO2006/093117
PCT Pub. Date: Sep. 8, 2006

(65) Prior Publication Data
US 2009/0232443 A1 Sep. 17, 2009

(30) Foreign Application Priority Data
Feb. 28, 2005 (JP) .................. 2005-053658

(51) Int. Cl.
*G02B 6/26* (2006.01)
*G02B 6/42* (2006.01)
*G02B 6/12* (2006.01)

(52) U.S. Cl. .......... 385/47; 385/14; 385/15; 385/31; 385/33; 385/38; 385/39; 385/44; 385/49; 385/115; 385/119; 385/120

(58) Field of Classification Search .......... 385/47, 385/49, 115, 119, 120
See application file for complete search history.

(56) References Cited

U.S. PATENT DOCUMENTS
4,092,061 A * 5/1978 Stigliani, Jr. ............ 385/33
(Continued)

FOREIGN PATENT DOCUMENTS
JP 4-30581 A 2/1992
(Continued)

OTHER PUBLICATIONS
Translation of JP 09270751 A Oct. 1997.*
(Continued)

*Primary Examiner* — Ryan Lepisto
(74) *Attorney, Agent, or Firm* — Sughrue Mion, PLLC

(57) ABSTRACT

Optical elements (light sources 16 or photodetectors 18) are arranged in a two-dimensional array, and the relative positional relationship between the optical elements and optical waveguides 12 is defined such that optical waveguides 12 extend between the optical elements in the two-dimensional array substantially parallel to substrate 19 for increased parallelism. Micromirrors 15 are disposed in respective optical waveguides 12 to bend light beams through 90 degrees to realize a highly efficient optical coupling between the optical elements and optical waveguides 12. The optical waveguides are stacked in multiple stages, and light beams are lead to the optical waveguides in the multiple stacks through micromirrors 15 across the stacked plane of the optical waveguides, thereby realizing parallel connection between the two-dimensional array of optical elements and a two-dimensional array of optical waveguides. There is thus provided a connection structure between the optical elements and optical waveguides 12, which is small in size and high in efficiency, and is of high parallelism.

6 Claims, 16 Drawing Sheets

U.S. PATENT DOCUMENTS

| | | | |
|---|---|---|---|
| 4,756,590 A * | 7/1988 | Forrest et al. | 385/89 |
| 5,416,861 A | 5/1995 | Koh et al. | |
| 5,439,647 A * | 8/1995 | Saini | 422/82.11 |
| 5,832,150 A * | 11/1998 | Flint | 385/31 |
| 6,088,498 A * | 7/2000 | Hibbs-Brenner et al. | 385/52 |
| 6,132,107 A * | 10/2000 | Morikawa | 385/89 |
| 6,326,939 B1 * | 12/2001 | Smith | 345/84 |
| 6,330,377 B1 * | 12/2001 | Kosemura | 385/14 |
| 6,404,960 B1 * | 6/2002 | Hibbs-Brenner et al. | 385/52 |
| 6,490,392 B1 * | 12/2002 | Munekata et al. | 385/31 |
| 6,685,792 B2 * | 2/2004 | Veligdan et al. | 156/256 |
| 6,709,607 B2 * | 3/2004 | Hibbs-Brenner et al. | 216/24 |
| 6,793,405 B1 * | 9/2004 | Murata et al. | 385/88 |
| 6,829,398 B2 * | 12/2004 | Ouchi | 385/14 |
| 6,914,231 B1 * | 7/2005 | Stone | 250/216 |
| 2003/0179979 A1 * | 9/2003 | Ouchi | 385/14 |
| 2004/0114854 A1 * | 6/2004 | Ouchi | 385/14 |
| 2004/0213503 A1 | 10/2004 | Cham et al. | |
| 2004/0218848 A1 * | 11/2004 | Shen et al. | 385/14 |
| 2005/0047716 A1 * | 3/2005 | Arakida et al. | 385/31 |

FOREIGN PATENT DOCUMENTS

| | | | |
|---|---|---|---|
| JP | 6-222229 A | 8/1994 | |
| JP | 7-128531 A | 5/1995 | |
| JP | 9-270751 A | 10/1997 | |
| JP | 09270751 A | * | 10/1997 |
| JP | 2000-39530 A | | 2/2000 |
| JP | 2000-235127 A | | 8/2000 |
| JP | 2001-141951 A | | 5/2001 |
| JP | 2001-185752 A | | 7/2001 |
| JP | 2001-242331 A | | 9/2001 |
| JP | 2002-258079 A | | 9/2002 |
| JP | 3371954 B2 | | 11/2002 |
| JP | 2003-114365 A | | 4/2003 |
| JP | 2004-170668 A | | 6/2004 |
| JP | 2004-198579 A | | 7/2004 |
| JP | 2004-205899 A | | 7/2004 |
| JP | 2005-37869 A | | 2/2005 |

OTHER PUBLICATIONS

2004 Proceedings of the IEICE General Conference, C-3-36, "Evaluation of 45° Micro Mirrors Fabricated with an Excimer Laser".

Yasuhiko Aoki, et al. "2-Dimensional Parallel Optical Interconnect Module Formation Based on Micro-Optical Bench Concept", The Transactions of the Institute of Electro C, Sep. 1, 2001, vol. J84-C, No. 9, pp. 807-813.

Japanese Office Action for corresponding Japanese Application No. 2007-505939 mailed Jul. 11, 2012.

* cited by examiner

CONNECTION STRUCTURE OF TWO-DIMENSIONAL ARRAY OPTICAL ELEMENT AND OPTICAL CIRCUIT

TECHNICAL FIELD

The present invention relates to a connection structure for connecting a two-dimensional array of optical elements and optical circuits.

BACKGROUND ART

One example of a so-called optical interconnection structure for connecting semiconductor chips, primarily high-speed LSI circuits, with an optical signal is shown in FIGS. 1A and 1B. In this structure, LSI circuits 2 on substrate 1 are connected to each other by thin optical waveguide 5 parallel to substrate 1 through PD (PhotoDiode: light-detecting device) 3 and VCSEL (Vertical Cavity Surface-Emitting Laser) 4. In the example shown in FIGS. 1A and 1B, interposers 1a are provided. The number of general connections (parallelism) is in the range from about 100 to 1000. An optical circuit generally refers to an optical fiber, an optical waveguide, and a combination of an optical fiber and an optical waveguide.

RELATED ART 1

It has heretofore been customary to optically connect a number of light sources and photodetectors by coupling optical fiber array 6 perpendicularly to a two-dimensional light source array (e.g., two-dimensional PD array 3) and a two-dimensional photodetector array (e.g., two-dimensional VCSEL array 4), as shown in FIGS. 2A and 2B. FIG. 2A shows a vertical connection structure in which optical fiber array 6 interconnects two-dimensional PD array 3 and two-dimensional VCSEL array 4 that are disposed perpendicularly on LSI circuits 2 on substrate 1. FIG. 2B shows a direct connection structure in which optical fiber array 6 interconnects two-dimensional PD array 3 and two-dimensional VCSEL array 4 that are disposed parallel on LSI circuits 2 on substrate 1. These connection structures have been problematic in that they are thick as a whole due to a limitation posed by the minimum bend radius of optical fiber array 6 (see IEICE Transactions C, Vol. J84-C, No. 9, pp. 807-813, September 2001, "2-Dimensional Parallel Optical Interconnect Module Formation Based on Micro-Optical Bench Concept").

RELATED ART 2

A connection structure using a one-dimensional array and an optical waveguide has limitations as to the degree of multiplexing for simultaneous parallel transmission (parallelism) because it is applicable to only a one-dimensional array of light sources and photodetectors (see 2004 Proceedings of the IEICE General Conference, C-3-36, "Evaluation of 45° Micro Mirrors Fabricated with an Excimer Laser"). FIG. 2C shows an N×1 folded connection structure using a 45° mirror. In this structure, micromirror 8 is disposed opposite VCSEL 7 and optically coupled to one optical waveguide 9.

RELATED ART 3

FIG. 2D shows a structure in which a plain mirror is disposed at the position of an end of a multilayer optical waveguide. Light emitted from VCSEL 7 positioned below in FIG. 2D is reflected by mirror 10 and applied to optical waveguide 11. Since mirror 10 has only one reflecting surface, the pitch of VCSEL 7 and the thickness of multilayer optical waveguide 11 needs to be the same as each other, thus preventing the optical waveguide which includes the optical coupling from having a higher packing density.

DISCLOSURE OF THE INVENTION

It is a first object of the present invention to solve the problems of the related art described above, overcome the limited parallelism that has existed in a connection structure using a one-dimensional array of the related art, and greatly increase the parallelism, i.e., greatly increase the number of connections. A second object of the present invention is to provide a low-profile connection structure for connecting a two-dimensional array of optical elements and optical circuits, which can be laid parallel along a substrate on which devices such as LSI circuits are mounted.

According to the present invention, a connection structure for connecting a two-dimensional array of optical elements and optical circuits, includes a two-dimensional array of optical elements, and a plurality of optical circuits extending between the optical elements, the optical circuits being optically connected to the optical elements by a mirror. The optical circuits are stacked in multiple layers, and the optical circuits in each layer extend between the optical elements arranged in the two-dimensional array. The optical circuits in each layer may be optically connected to the optical elements by the mirror.

According to the present invention, another connection structure for connecting a two-dimensional array of optical elements and optical circuits, includes optical circuits stacked in multiple layers, and mirrors disposed in the optical circuits in the layers and optically coupled to respective optical elements arranged in a two-dimensional array. Each of the optical circuits (e.g., each of optical waveguides) has an individual mirror (micromirror). This arrangement is clearly different from an arrangement wherein a common mirror (mirror at 45 degrees) is shared by a plurality of optical circuits.

These arrangements have greater parallelism and smaller size than heretofore, and are capable of optically connecting a number of optical elements and a number of optical circuits to each other.

The optical circuits may be inclined to the two-dimensional array of the optical elements.

Of the optical circuits in the layers, adjacent layers may have a common cladding layer. The optical circuits may be disposed on a surface of a substrate in which the optical element is embedded. The optical elements may be mounted in cavities defined in the optical circuits. These arrangements are effective to make the connection structure lower in profile.

In the arrangements described above, the optical circuits should preferably comprise optical waveguides.

According to the present invention, a plurality of optical elements arranged in a two-dimensional array and optical circuits can efficiently be connected to each other, and the size of a connection structure can be reduced and its profile lowered.

BEST MODE FOR CARRYING OUT THE INVENTION

Exemplary Embodiment 1

Figure 3A:
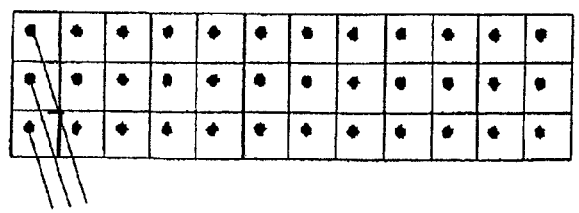
Figure 3B:
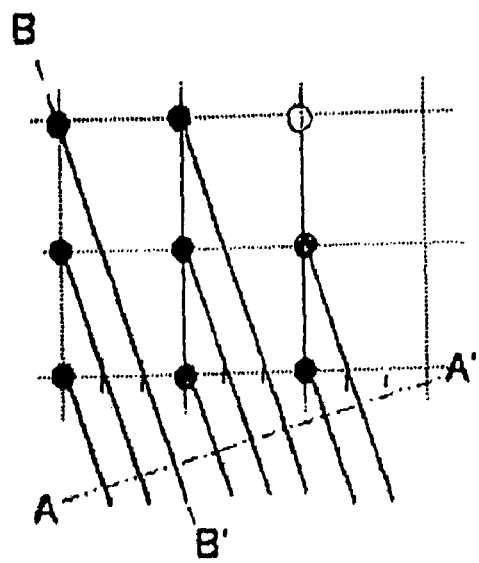
Figure 3C:
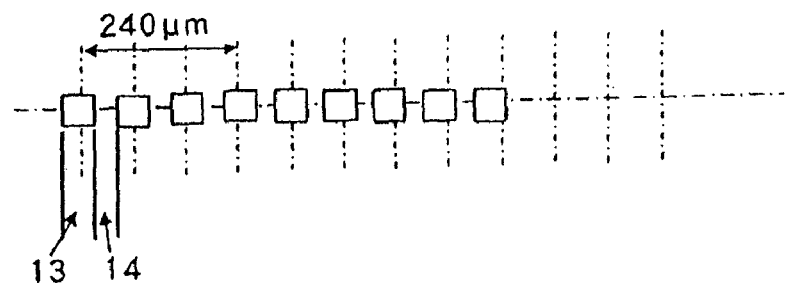
Figure 3D:
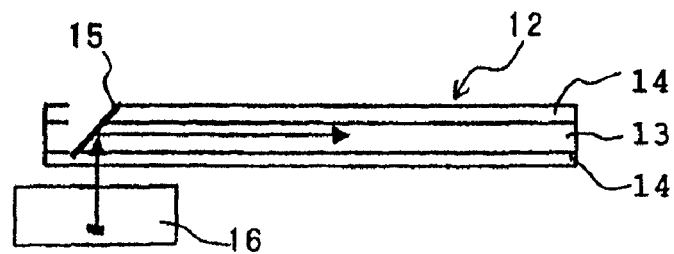

FIGS. 3A through 3D show Exemplary embodiment 1 of the present invention. FIG. 3A schematically shows a two-dimensional array of optical elements, FIG. 3B is an enlarged view of FIG. 3A, FIG. 3C is a cross-sectional view taken along line A-A' of FIG. 3B, and FIG. 3D is a cross-sectional view taken along line B-B' of FIG. 3B.

According to the present exemplary embodiment, an array of optical waveguides 12 is inclined obliquely to a two-dimensional array of optical elements 16 such as light sources or the like. This arrangement makes it possible to connect a group of optical waveguides to an array of optical elements in three rows, rather than to an array of optical elements in one row which has heretofore been possible (see FIG. 3C). As shown in FIG. 3D, light sources 16 and optical waveguides 12 are connected to each other by micromirrors 15 comprising 45° plane reflecting mirrors or curved reflecting mirrors disposed in portions of optical waveguides 12 for bending light beams from light sources (VCSELs) 16 at a right angle. With optical waveguides 12 being disposed obliquely to the two-dimensional array of VCSELs 16 and extending between VCSELs 16, optical waveguides can be connected to an array of optical elements in three rows if the optical elements have a pitch of about 250 μm. For example, as shown in FIG. 3C, if optical waveguides each comprising core 13 having a diameter of 50 μm and cladding 14 having a thickness of 30 μm are juxtaposed, then an array of optical elements in three rows is provided over a pitch of 240 μm.

Figure 3E:
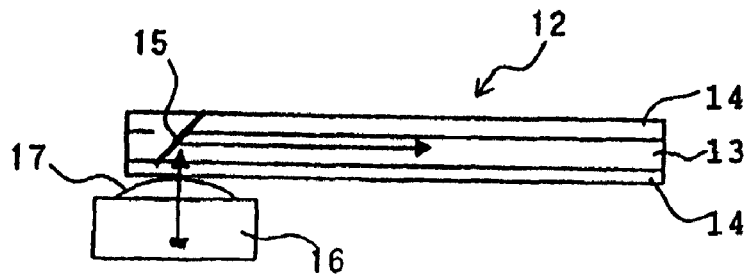
Figure 3F:
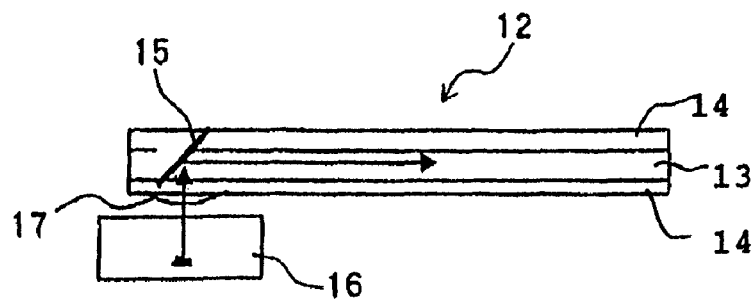

As shown in FIGS. 3E and 3F, the optical coupling efficiency is increased by providing lens 17 on VCSELs 16 or on optical waveguides 12. Lens 17 on VCSELs 16 shown in FIG. 3E may be fabricated by etching substrate 1 or by dropping and curing a transparent synthetic resin on substrate 1.

Figure 4A:
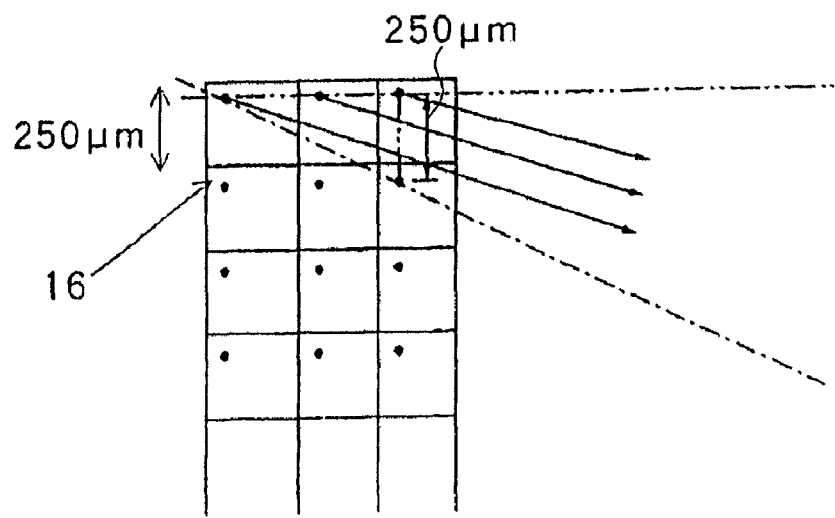
Figure 4B:
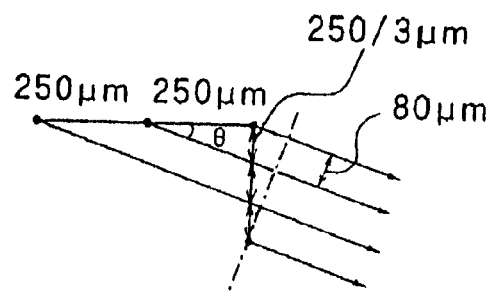
Figure 4C:
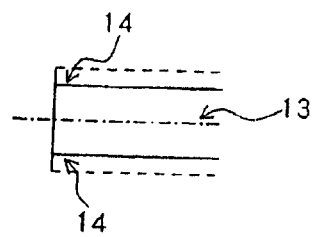

According to a structure shown in FIGS. 4A through 4C wherein the pitch between optical elements is 250 μm and core 13 of each of optical waveguides 12 has a cross-sectional size of 50 μm×50 μm and the pitch between cores 13 is 80 μm, light can be lead between optical elements in three rows. FIG. 4A shows a M×N two-dimensional array of optical elements for outputting light to optical waveguides 12 in a single layer (single step) through clearances between the emitted light beams from VCSELs 16. FIG. 4B shows a structure for taking out emitted light at intervals of 80 μm from an array of optical elements in three rows. FIG. 4C shows the structure of an optical waveguide wherein cladding 14 having a thickness of 15 μm is provided on each side of core 13 having a diameter of 50 μm.

In the above description and the description which follows, VCSELs 16 are described. However, PDs used instead of VCSELs 16 can also realize the same structure as described above except that the light is differently oriented.

Exemplary Embodiment 2

Figure 5A:
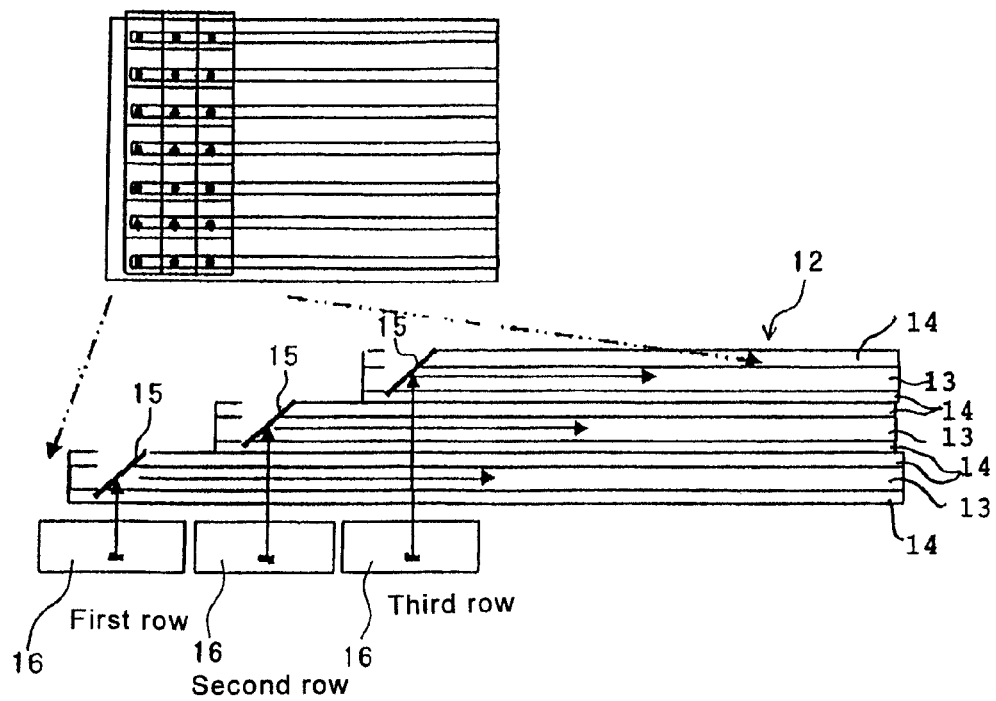

FIG. 5A shows Exemplary embodiment 2 of the present invention. According to Exemplary embodiment 2, a basic structure comprises a one-dimensional array of micromirrors 15 and optical waveguides 12 connected thereto, and a plurality of such basic structures are stacked with adjacent basic structures being shifted from each other by a length of one row of optical element array. Optical waveguides 12 are connected to a two-dimensional array of optical elements 16. If each optical waveguide 12 comprises core 13 having a diameter of 50 μm and cladding having a thickness of 25 μm on each side of core 13, then one layer (one step) of optical waveguides 12 has a thickness of 100 μm. Therefore, provided that the light beams from optical elements 16 are appropriately shaped, it is possible to stack optical waveguides 12 in five to ten layers. If one array of optical elements contains 20 optical elements, then about 100 to 200 multiplex parallel light connections can be achieved between the optical elements and the optical waveguides. With this arrangement, the overall thickness of multilayer optical waveguides 12 is 1 mm or less, and hence multilayer optical waveguides 12 can be laid in substantial closely contact with the substrate. Therefore, an increase in the entire connection structure due to the multilayer optical waveguides poses almost no problem. Optical waveguides 12 thus stacked in M layers make it possible to realize M×N parallel light connections. The number M of layers is determined by the coupled state of VCSELs 16 and optical waveguides 12. The coupling efficiency is improved by imparting a curvature to micromirrors 15 or by applying a lens to the surfaces of VCSELs 16. Alternatively, the coupling efficiency may be improved by forming a microlens on the surfaces of optical waveguides 12.

Figure 5B:
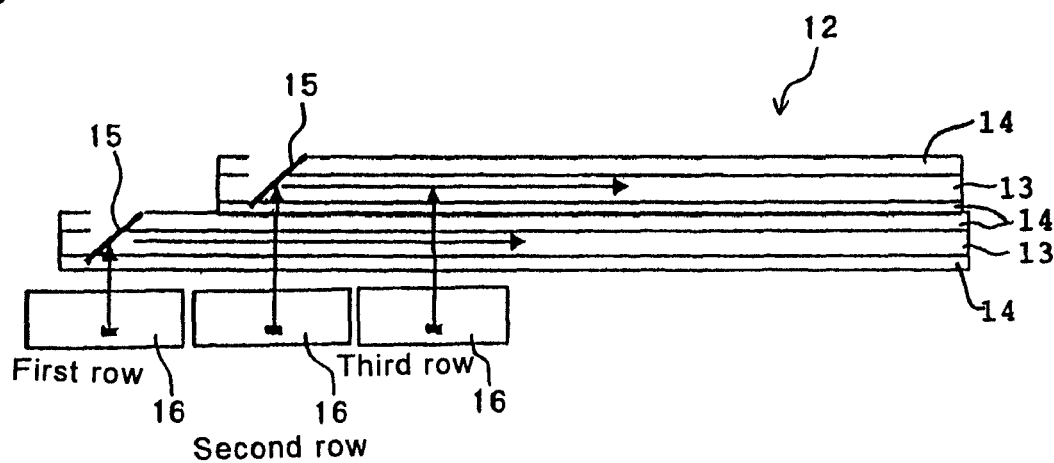

As shown in FIG. 5B, the number of rows of optical elements (VCSELs 16) and the number of layers of optical waveguides 12 may not be the same as each other. In FIG. 5B, VCSELs 16 are provided in three rows, and optical waveguides 12 are provided in two layers. VCSELs 16 in the third row are optically coupled to optical waveguides 12 in the second layer. However, VCSELs 16 in the second row and VCSELs 16 in the third row are coupled to different optical waveguides 12 in the second layer.

Figure 5C:
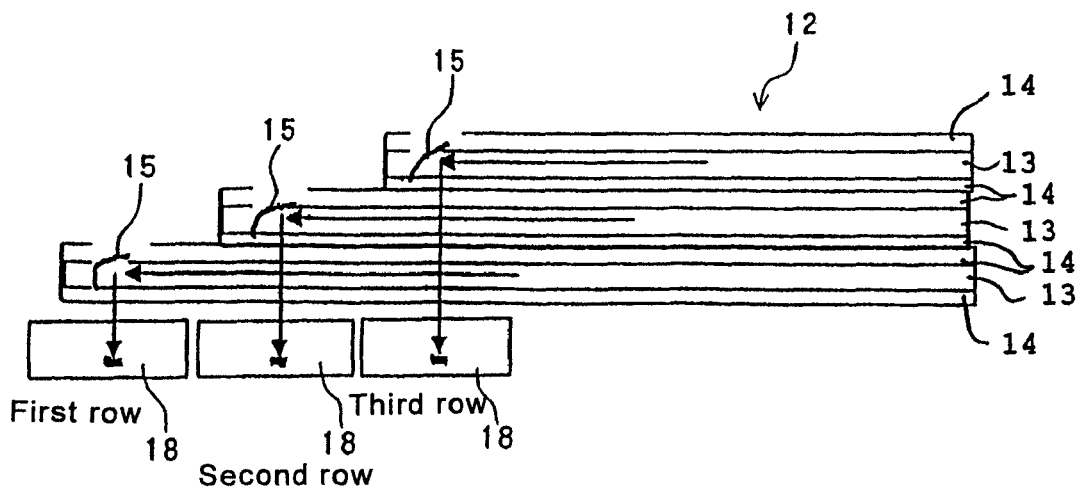

FIG. 5C shows an example in which PDs 18 are coupled to optical waveguides 12. In this structure, micromirrors 15 in each layer have different radii of curvature so that their focal points are aligned with the positions of PDs 18 for increased coupling efficiency with respect to PDs 18.

Exemplary Embodiment 3

Figure 6:
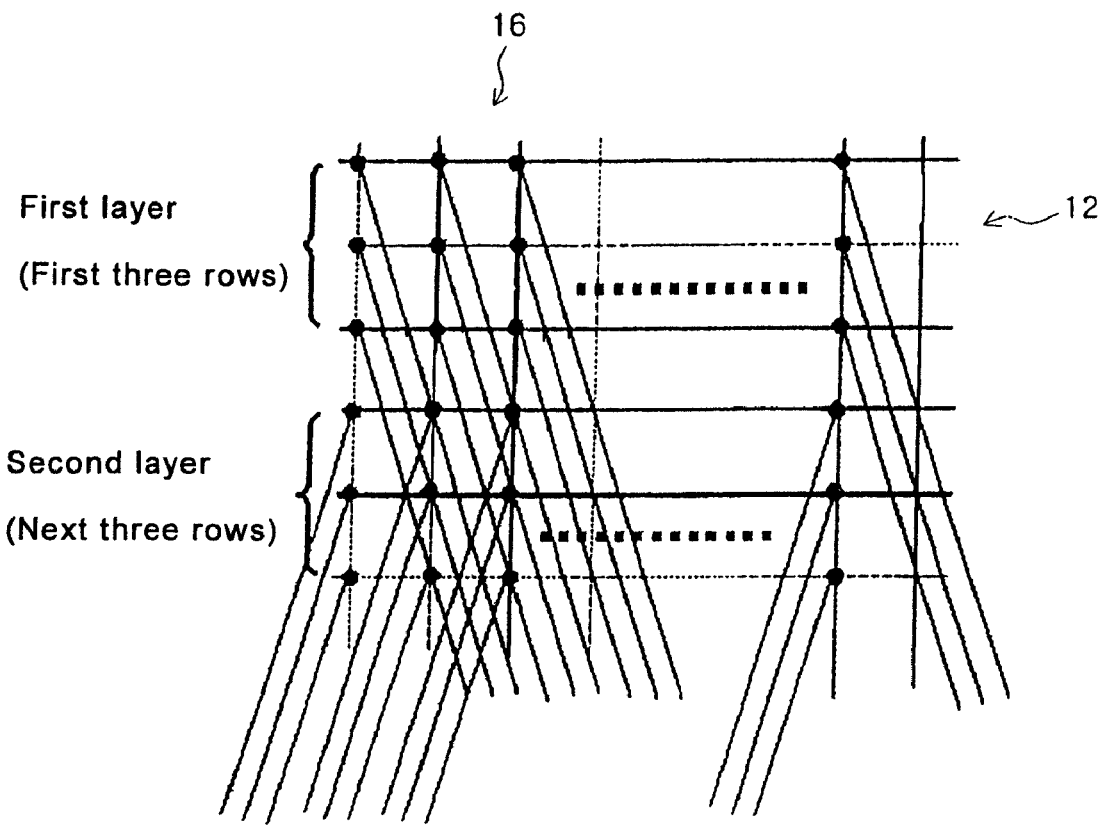

FIG. 6 shows Exemplary embodiment 3 of the present invention. According to Exemplary embodiment 3, the structure according to Exemplary embodiment 1 is stacked in multiple layers with adjacent basic structures being shifted from each other by a length of one row of optical element array. According to Exemplary embodiment 3, it is possible to provide parallel multiplex light connections in a higher packing density than according to Exemplary embodiment 2.

[Analysis of Optical Coupling]

The results of an analysis of an optical coupling among VCSELs 16, micromirrors 15, and optical waveguides 12 will be described below.

Figure 7A:
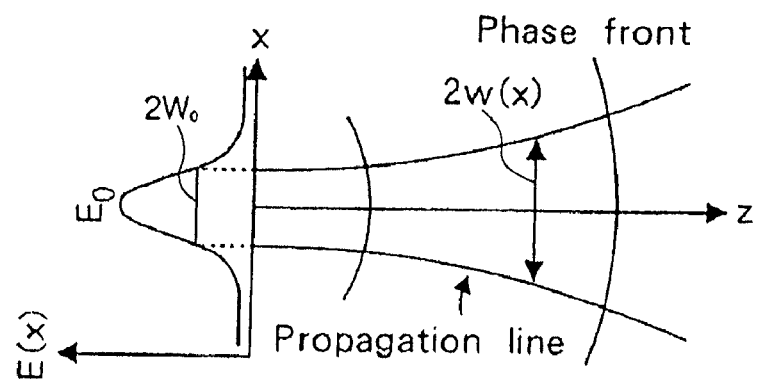

As shown in FIG. 7A, calculations were carried out on the assumption that a Gaussian beam is emitted from VCSEL 16. The spot size of the emitted beam from VCSEL 16 is spread as shown in FIG. 7A. The spot size $W_0$ is represented by the radius of the emitted beam as shown in FIG. 7A. The spot size $W(z)$ is calculated according to the following equation:

$$w(z) = \left[1 + \left(\frac{2z}{w_0 n k_0}\right)^2\right]^{\frac{1}{2}}$$

Figure 7B:
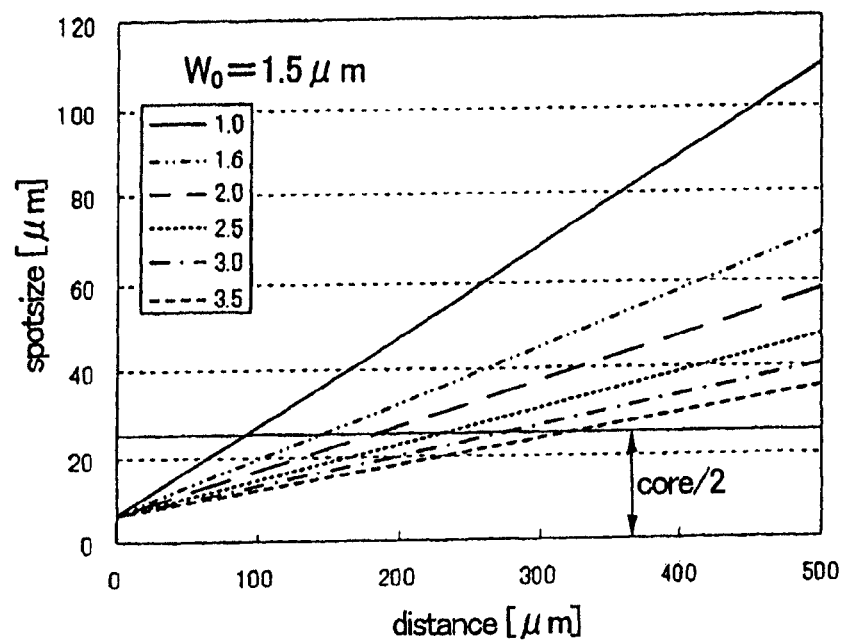

FIG. 7B shows how the light beam is spread as it is propagated when spot size $W_0$ is 1.5 μm and refractive index n of the optical path through which the emitted beam is propagated is changed to 1.0, 1.6, 2.0, 2.5, 3.0, and 3.5.

A loss that is caused when the emitted beam from VCSEL 16 is coupled to a multimode optical waveguide will be analyzed below. An Herimtian-Gaussian function for describing the electric field of the emitted beam from VCSEL 16 is Fourier-transformed to determine a spreading angle component $E^{(p)}(x)$ of the electric field. The Herimtian-Gaussian function and the Fourier-transform equation are shown as follows:

Herimtian-Gaussian Function:

$$E^{(p)}(x) = \frac{1}{\left[2^p p! \omega_0 \sqrt{\frac{\pi}{2}}\right]^{\frac{1}{2}}} \cdot H_p\left(\sqrt{2}\frac{x}{\omega_0}\right) \cdot e^{-\left(\frac{x}{\omega_0}\right)^2}$$

Fourier Transform:

$$v_x = \frac{n}{\lambda}\sin\theta$$

Figure 8:
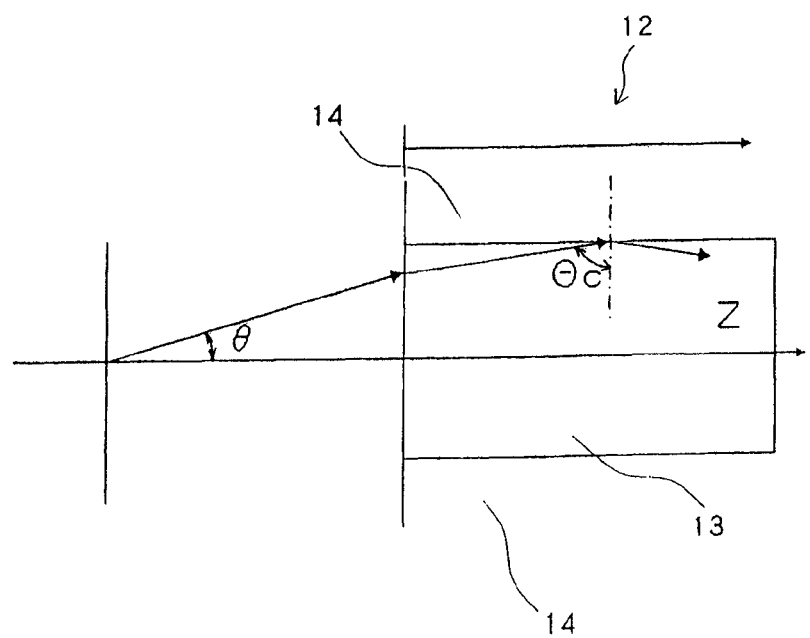

To optical waveguide 12, there is coupled a light beam within an angular range determined by the total angle of reflection that is determined by the difference between the refractive indexes of core 13 and cladding 14. Based on this property of optical waveguide 12, if the distance between VCSEL 16, serving as a light source, and optical waveguide 12 is small, a light beam within an angular range determined by the total angle of reflection Θc is coupled to optical waveguide 12 shown in FIG. 8. As the distance between VCSEL 16 and optical waveguide 12 increases, of the light radiated and spread from VCSEL 16, the light that falls in the area of the core of optical waveguide 12 is coupled to optical waveguide 12 at the time that it reaches the core of optical waveguide 12. As the distance becomes longer, the coupling loss increases.

Figure 9A:
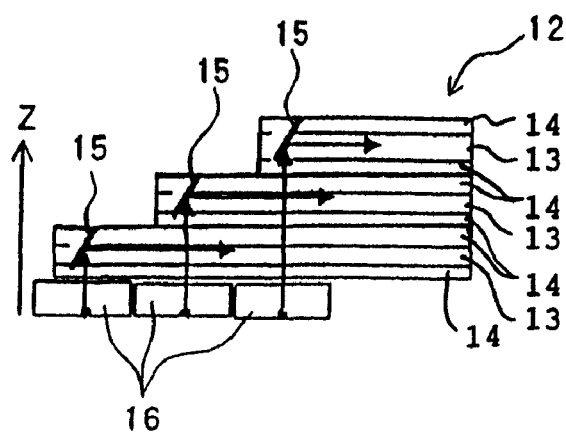
Figure 9B:
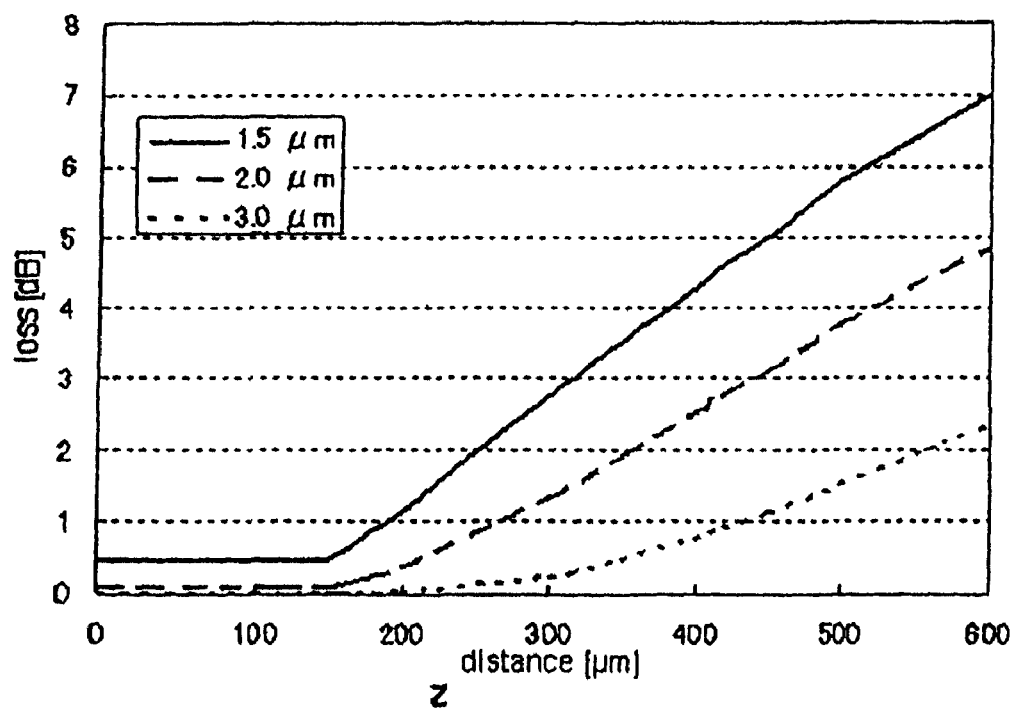

The coupling between VCSELs 16 and optical waveguides 12 described above is shown in FIGS. 9A and 9B. The arrangement shown in FIG. 9A employs VCSELs 16 having a refractive index of 3.5 and a thickness of 100 μm and having a structure for emitting light from a GaAs substrate. The relative refractive index difference between the core and cladding of optical waveguides 12 is 2%, and the core has a cross-sectional size of 50 μm×50 μm. FIG. 9B is a graph showing the relationship between the distance that light is propagated and the coupling losses when spot sizes $W_0$ are 1.5 μm, 2.0 μm, and 3.0 μm of the light emitted from VCSEL 16 with its light emission point used as the origin of the coordinate axes. In order to reduce the coupling loss to 1 dB or smaller, the maximum optical waveguide thicknesses when spot sizes $W_0$ are 1.5 μm, 2.0 μm, and 3.0 μm, are 190 μm, 270 μm, and 420 μm, respectively. If one layer of optical waveguide 12 has a thickness of 100 μm (core: 50 μm, upper cladding: 25 μm, and lower cladding: 25 μm), then it is possible to stack optical waveguides 12 in two layers, three layers, or four layers.

Figure 10:
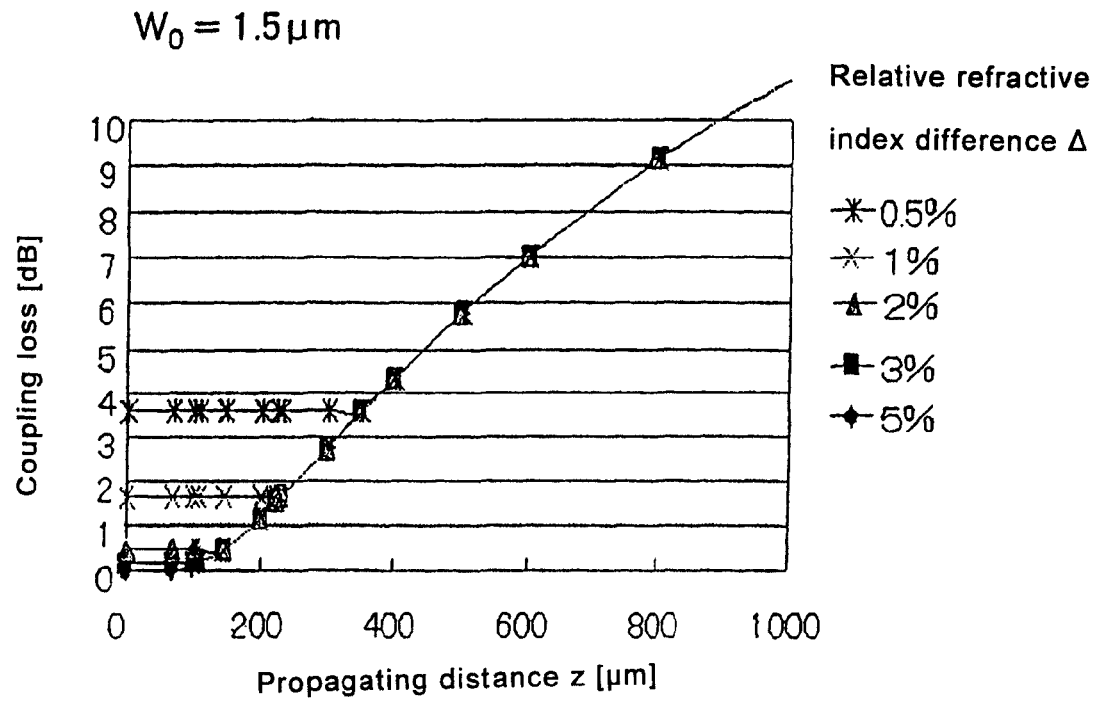
Figure 11:
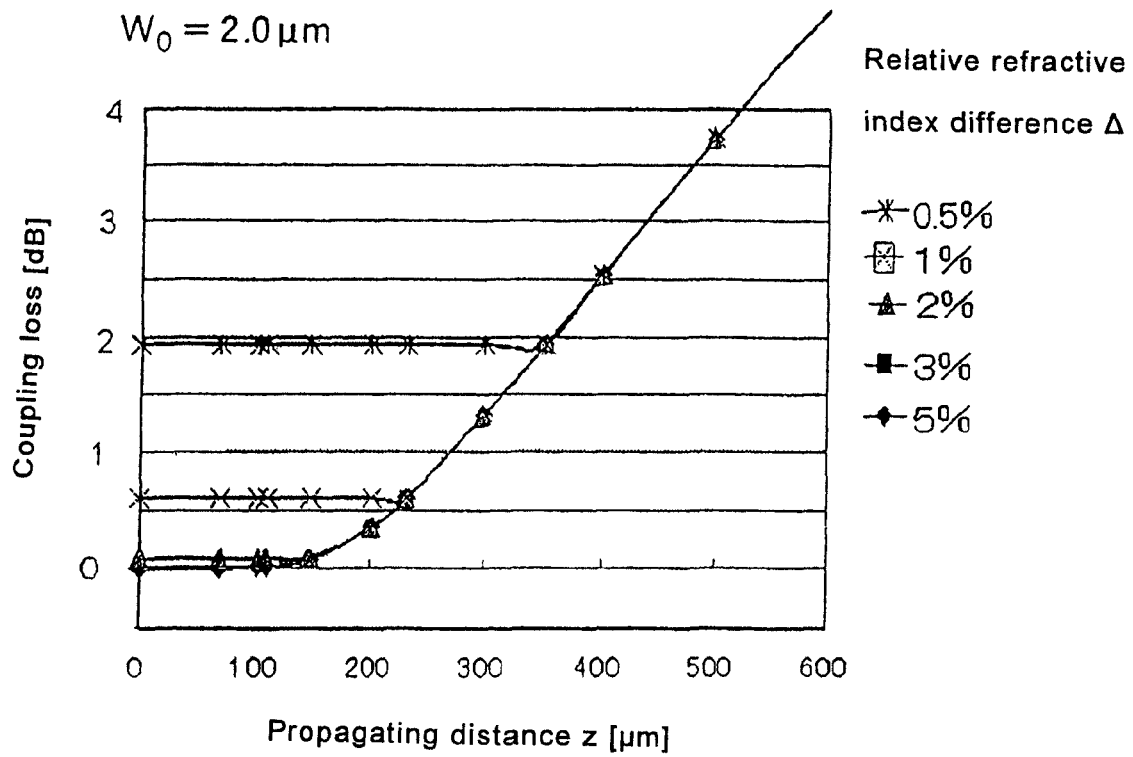
Figure 12:
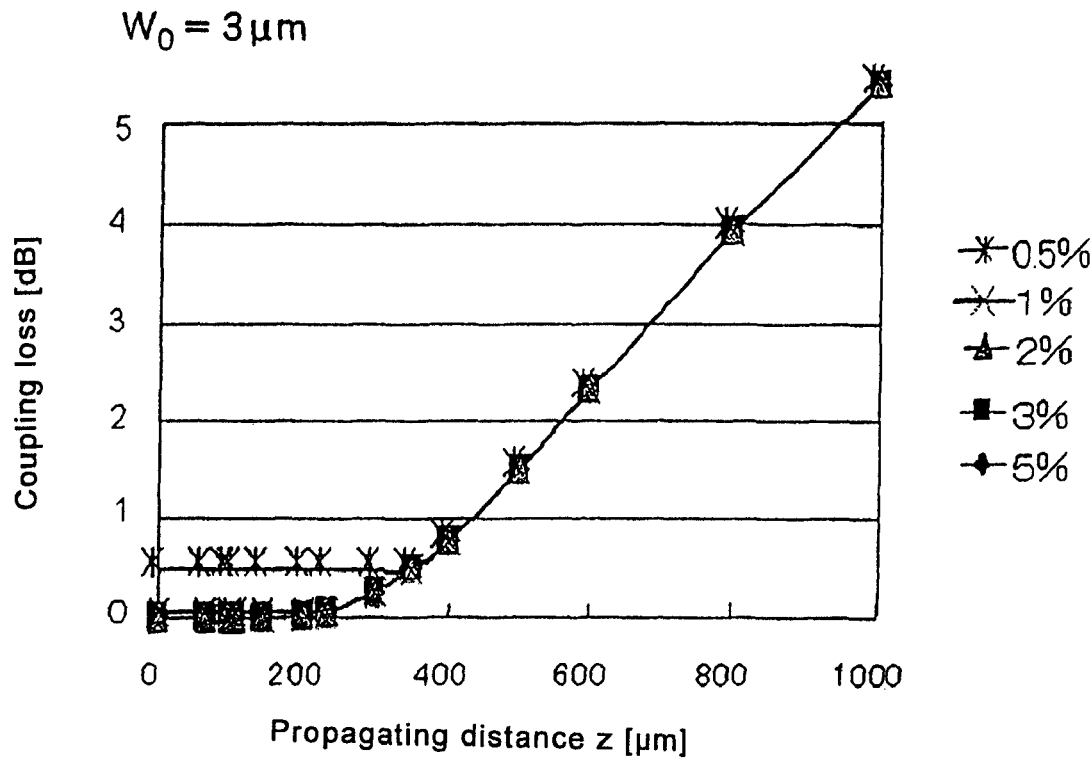
Figure 13A:
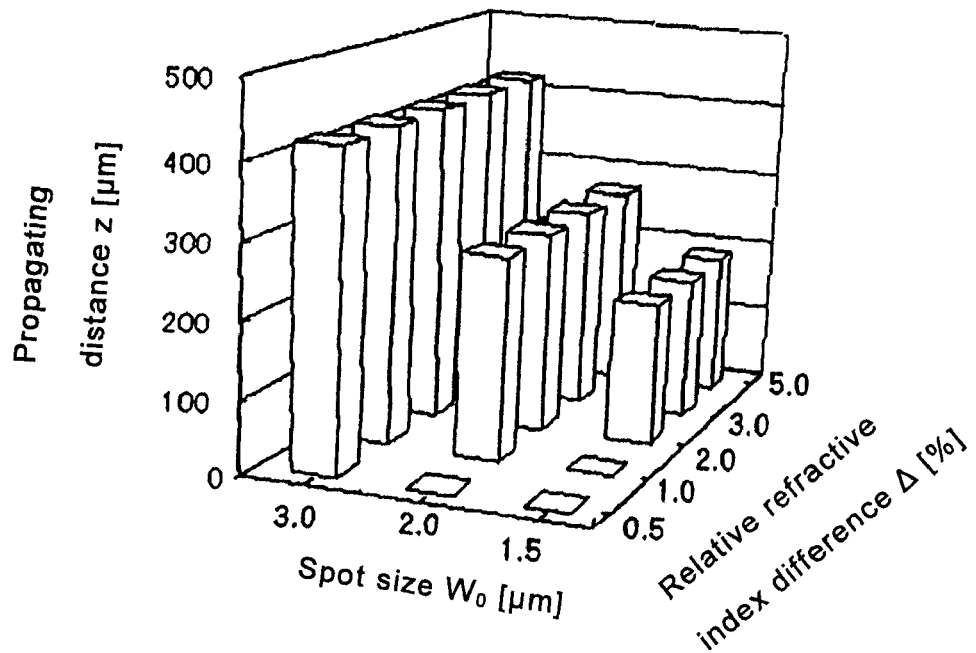
Figure 13B:
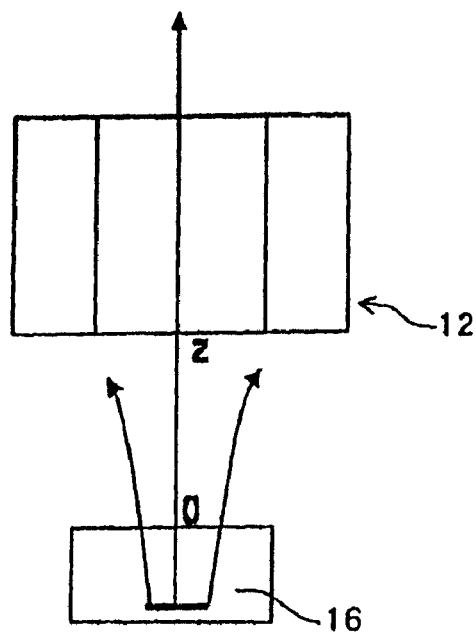
Figure 14A:
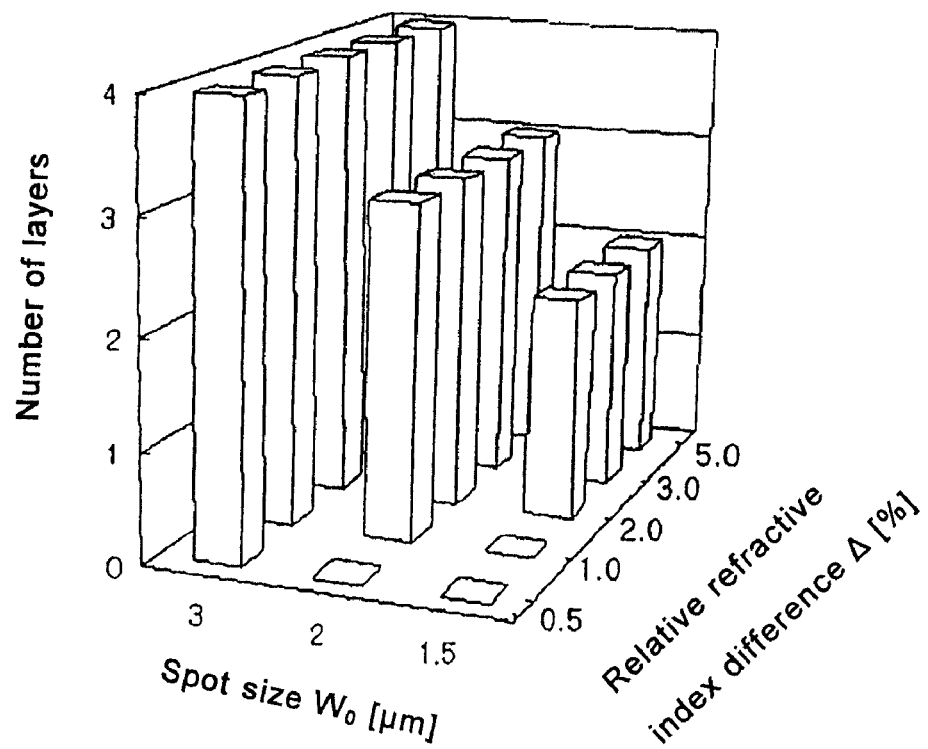
Figure 14B:
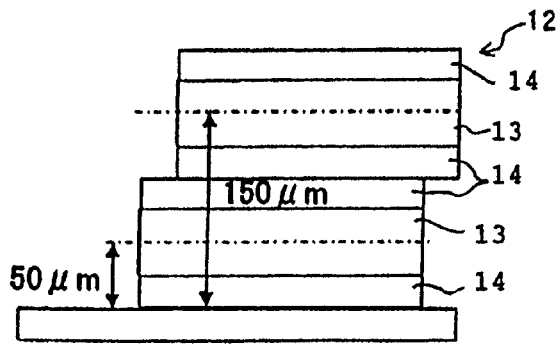
Figure 14C:
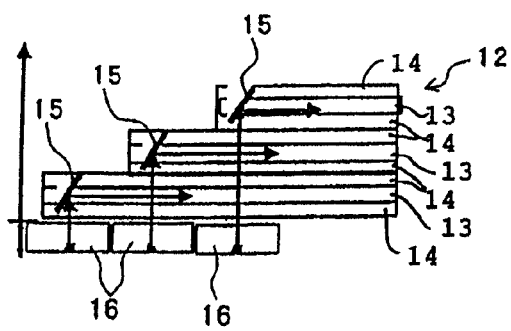

FIGS. 10, 11, and 12 show coupling losses that are caused when the relative refractive index difference of optical waveguides 12 is varied with spot sizes $W_0$ fixed to 1.5 μm, 2.0 μm, or 3.0 μm, respectively. Based on the results, distances that the light is propagated from VCSELs 16 to optical waveguides 12 at the time that the coupling loss is 1 dB, are shown as a three-dimensional graph in FIG. 13A. The results as converted into the numbers of steps (the number of layers) of optical waveguides 12 that can be stacked are shown in FIG. 14A.

It can be confirmed from the analyzed results that the optical coupling which has a sufficiently low coupling loss of 1 dB and has up to four layers of optical waveguides 12 can be realized, depending on the spot size of the VCSELs 16, in a multilayer optical waveguide structure wherein VCSELs 16 and optical waveguides 12 are directly connected to each other.

Exemplary Embodiment 4

Figure 15A:
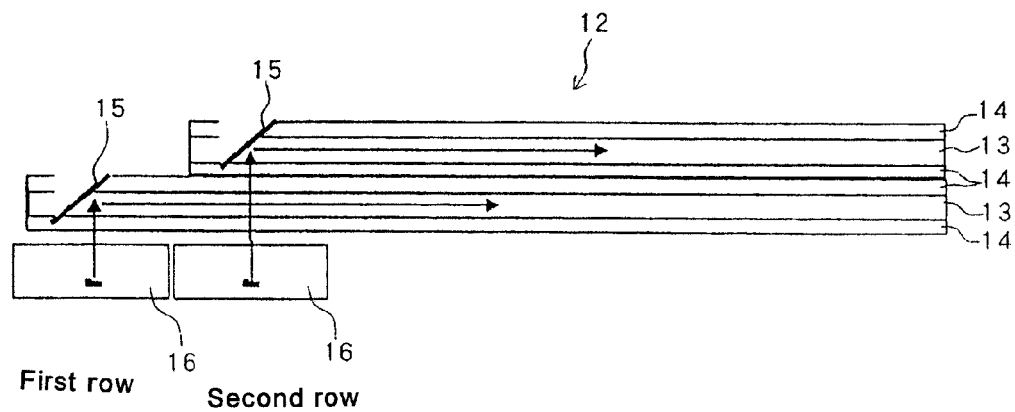
Figure 15B:
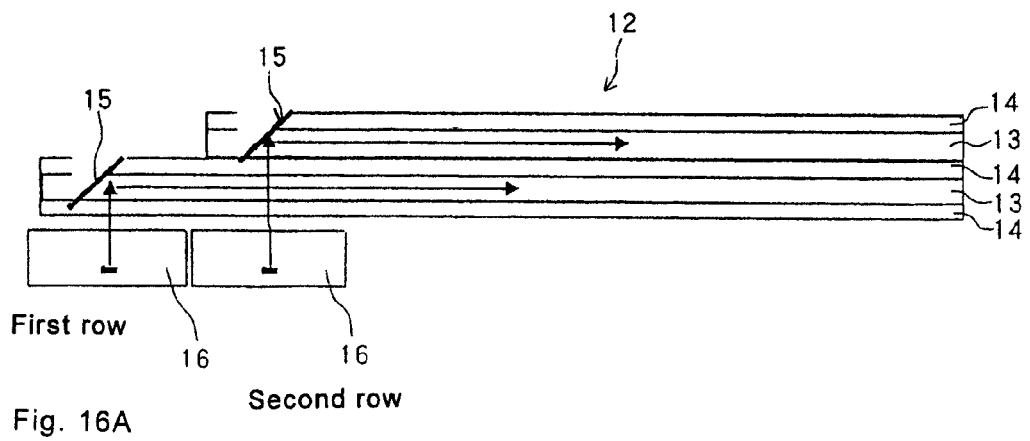

In the optical connection structure of a two-dimensional array of optical elements 16 employing optical waveguides 12 stacked in multiple layers as shown in FIGS. 5A through 5C, cladding layers 14 of optical waveguides 12 in adjacent layers can be shared as a common cladding layer to produce the two advantages to be described below. FIGS. 15A and 15B show an example of optical waveguides 12 in two layers. In the arrangement shown in FIG. 15A, optical waveguide 12 in each layer has cladding layer 14. In the arrangement shown in FIG. 15B, cladding layer 14 of optical waveguides 12 in first and second layers are shaped as a common cladding layer. Specifically, in the arrangement shown in FIG. 15B, upper cladding layer 14 of optical waveguide 12 in the first layer (close to optical elements (VCSELs 16)) and lower cladding layer 14 of optical waveguide 12 in the second layer (remote from optical elements (VCSELs 16)) are shaped as a common cladding layer.

The structure employing common cladding layer 14 provides a first advantage in that the overall thickness of optical waveguides 12 can be reduced by about 25 μm which represents the thickness of one layer of ordinary cladding layer 14. Since the overall thickness of ordinary optical waveguides 12 in two layers is about 200 μm, the use of common cladding layer 14 is effective to reduce the thickness by 12.5%. In addition, since one cladding layer 14 is eliminated, the amount of material used is reduced and the fabrication process is simplified, resulting in a reduction in cost.

The second advantage is that the distance from VSCELs 16 to optical waveguide 12 in the second layer can be reduced. With the above structure, the distance from optical elements 16 to core 13 of optical waveguide 12 in the second layer can be reduced by 25 μm. Since the optical path length can be shortened, the optical coupling efficiency between the optical elements and optical waveguides 12 is increased.

Exemplary Embodiment 5

Figure 1A:
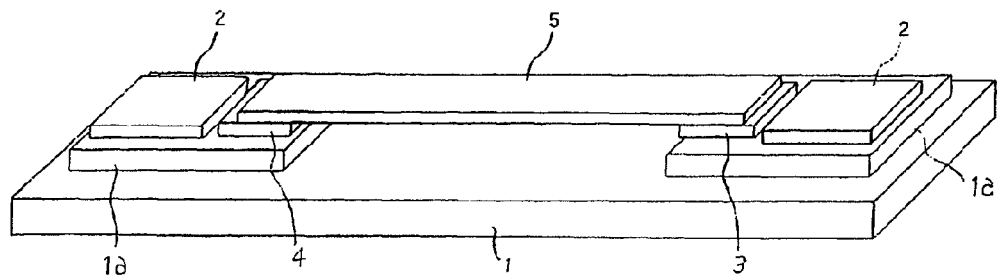
FIG. 1A A schematic perspective view of an optical interconnection structure of the related art FIG. 1B A front elevational view of the optical interconnection structure of the related art shown in FIG. 1A FIG. 2A A schematic front elevational view of a vertical connection structure using optical fibers of the related art FIG. 2B A schematic front elevational view of a direct connection structure using optical fibers of the related art FIG. 2C A schematic front elevational view of an N×1 folded connection structure using a 45° mirror of the related art FIG. 2D An enlarged partial view of a connection structure with a mirror disposed at an end of a multilayer optical waveguide of the related art FIG. 3A A view showing a two-dimensional array of optical elements of a connection structure according to Exemplary embodiment 1 of the present invention FIG. 3B An enlarged view of FIG. 3A FIG. 3C A view of the connection structure taken along line A-A' of FIG. 3B FIG. 3D A view of the connection structure taken along line B-B' of FIG. 3B FIG. 3E A cross-sectional view showing a structure in which a lens is fixed to the optical elements shown in FIG. 3D FIG. 3F A cross-sectional view showing a structure in which a lens is fixed to an optical waveguide shown in FIG. 3D FIG. 4A A schematic view showing another example of the two-dimensional array of optical elements of the connection structure according to Exemplary embodiment 1 of the present invention FIG. 4B An enlarged view showing, in detail, a three-row array of the two-dimensional array of optical elements shown in FIG. 4A FIG. 4C An enlarged view showing an optical waveguide connected to the two-dimensional array of optical elements shown in FIG. 4A FIG. 5A A schematic front elevational view of a connection structure according to Exemplary embodiment 2 of the present invention FIG. 5B A schematic front elevational view of another example of the connection structure according to Exemplary embodiment 2 of the present invention FIG. 5C A schematic front elevational view of still another example of the connection structure according to Exemplary embodiment 2 of the present invention FIG. 6 A diagram showing the positional relationship between a two-dimensional array of optical elements and optical waveguides of a connection structure according to Exemplary embodiment 3 of the present invention FIG. 7A A diagram showing the manner in which light emitted from an optical element spreads FIG. 7B A graph illustrative of the manner in which light emitted from an optical element spreads FIG. 8 A diagram illustrative of the manner in which light travels in an optical waveguide FIG. 9A A schematic front elevational view showing an optically coupled state of optical elements and optical waveguides according to the present invention FIG. 9B A graph showing the relationship between the distance that light is propagated and the coupling loss in the optically coupled state shown in FIG. 9A FIG. 10 A graph showing the relationship between the distance that light is propagated and the coupling loss of an optical coupling between optical elements and optical waveguides according to the present invention FIG. 11 A graph showing the relationship between the distance that light is propagated and the coupling loss of an optical coupling between optical elements and optical waveguides according to the present invention FIG. 12 A graph showing the relationship between the distance that light is propagated and the coupling loss of an optical coupling between optical elements and optical waveguides according to the present invention FIG. 13A A graph showing the relationship between the spot size, the relative refractive index difference, and the distance that light is propagated, of an optical coupling between optical elements and optical waveguides according to the present invention FIG. 13B A diagram illustrative of the relationship between the spot size, the relative refractive index difference, and the distance that light is propagated shown in FIG. 13A FIG. 14A A table showing the relationship between the spot size, the relative refractive index difference, and the number of layers that can be stacked, of an optical coupling between optical elements and optical waveguides according to the present invention FIG. 14B A view illustrative of the relationship between the spot size, the relative refractive index difference, and the number of layers that can be stacked, shown in FIG. 14A FIG. 14C A view illustrative of the relationship between the spot size, the relative refractive index difference, and the number of layers that can be stacked, shown in FIG. 14A FIG. 15A A schematic front elevational view of a structure in which each of optical waveguides stacked in multiple layers has a cladding, of a connection structure according to Exemplary embodiment 4 of the present invention FIG. 15B A schematic front elevational view of a structure in which a common cladding is shared by optical waveguides stacked in multiple layers, of the connection structure according to Exemplary embodiment 4 of the present invention FIG. 16A A schematic front elevational view of a structure in which an optical element is embedded in a recess in a substrate, of a connection structure according to Exemplary embodiment 5 of the present invention FIG. 16B A schematic front elevational view of a structure in which the substrate has a thickness reduced to a minimum, of the connection structure according to Exemplary embodiment 5 of the present invention FIG. 16C A schematic front elevational view of a structure including a compound wafer with a number of optical elements formed therein, of the connection structure according to Exemplary embodiment 5 of the present invention FIG. 17A A schematic front elevational view of a structure in which an optical element is embedded in an optical waveguide, of a connection structure according to Exemplary embodiment 6 of the present invention FIG. 17B A schematic front elevational view of a structure in which the connection structures shown in FIG. 17A are stacked in multiple layers FIG. 18 A schematic front elevational view of a connection structure according to Exemplary embodiment 7 of the present invention FIG. 19 A graph showing the relationship between the spot size of emitted light and the distance that light is propagated, of the connection structure according to Exemplary embodiment 7 of the present invention
Figure 1B:
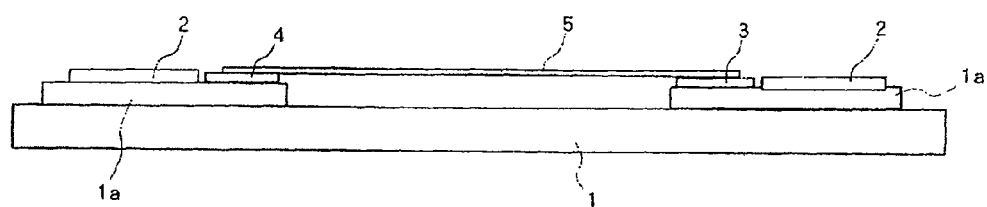
Figure 2A:
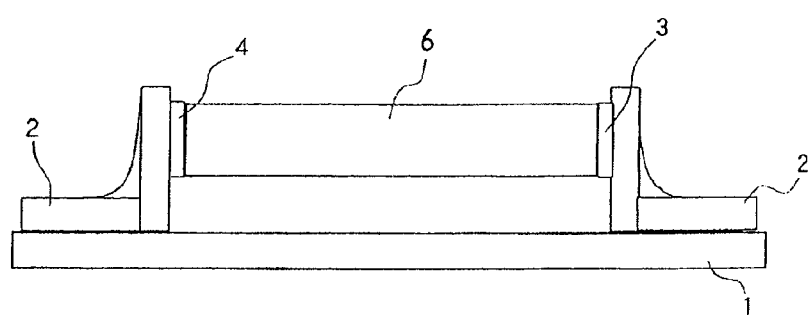
Figure 2B:
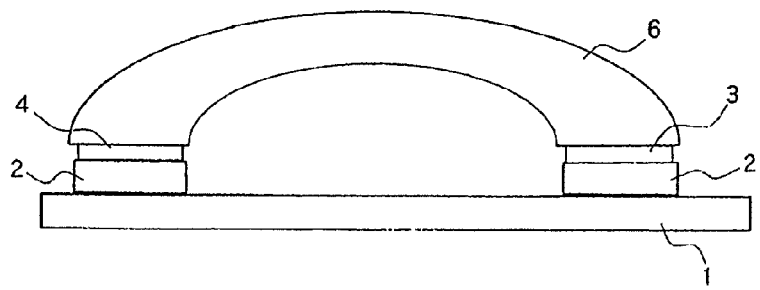
Figure 2C:
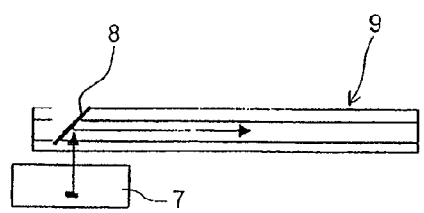
Figure 2D:
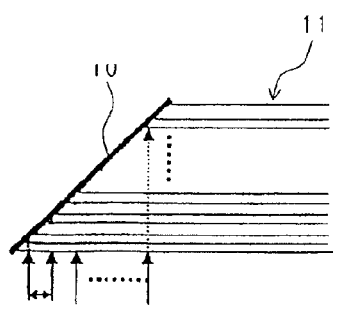
Figure 16A:
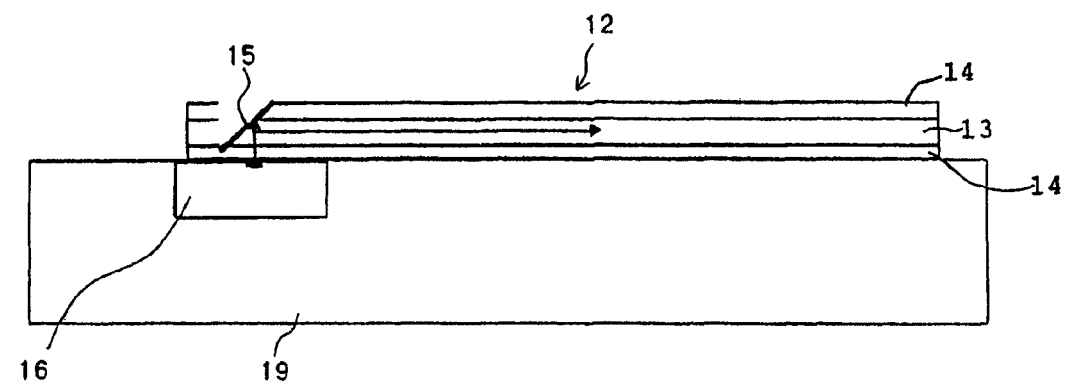
Figure 16B:
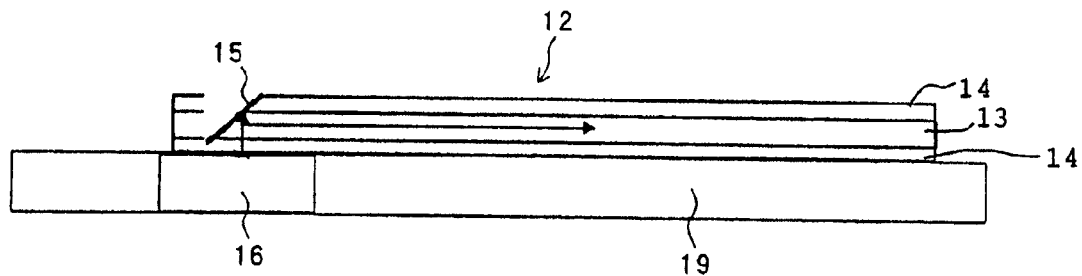
Figure 16C:
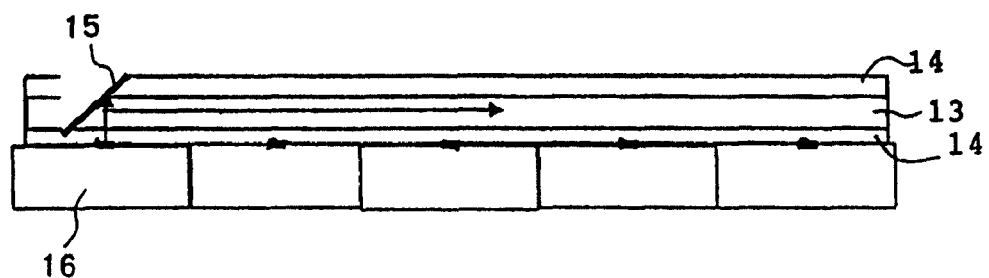

FIGS. 16A through 16C show structures in which optical elements (e.g., VCSELs 16) are embedded in substrate 19, the optical elements and substrate 19 have surfaces lying flush with each other, and optical waveguide 12 is disposed on the optical elements and substrate 19. The optical elements have light-emitting surfaces or light-detecting surfaces positioned closely to optical waveguides 12 for increased coupling efficiency. This structure provides the following advantages: According to the first advantage, a wide choice is available of methods of forming an optical circuit connected to the two-dimensional array of optical elements. According to the arrangement shown in FIG. 1, an optical circuit connected between optical elements needs to be in the form of a film. According to the arrangements shown in FIGS. 16A through 16C, however, since the optical circuit is disposed on the surface of substrate 19, the optical circuit may not be in the form of a film, but can be formed directly on substrate 19 by spin coating or the like.

The second advantage is that since the optical surface has its entire surface held in intimate contact with substrate 19, the overall optical circuit connected to the two-dimensional array of optical elements is structurally stable for increased reliability.

FIG. 16B shows a structure wherein substrate 19 is partially removed except for a thickness required to embed optical elements therein. The overall connection structure is thus made low in profile.

FIG. 16C shows a structure wherein optical waveguide 12 is disposed on a compound wafer (e.g., GaAs wafer) with a number of optical elements 16 formed therein, for emitting the light in a direction parallel to the wafer.

Exemplary Embodiment 6

Figure 17A:
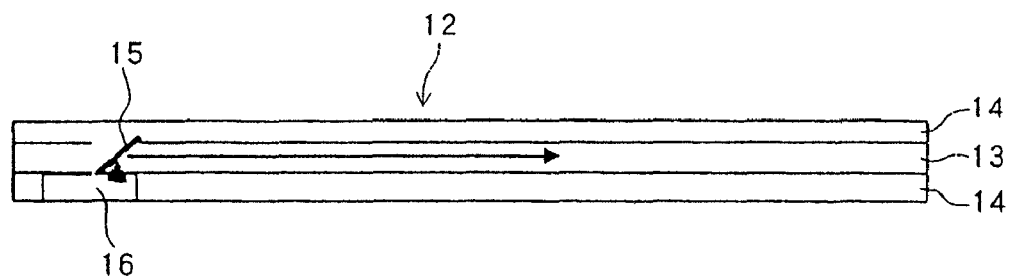
Figure 17B:
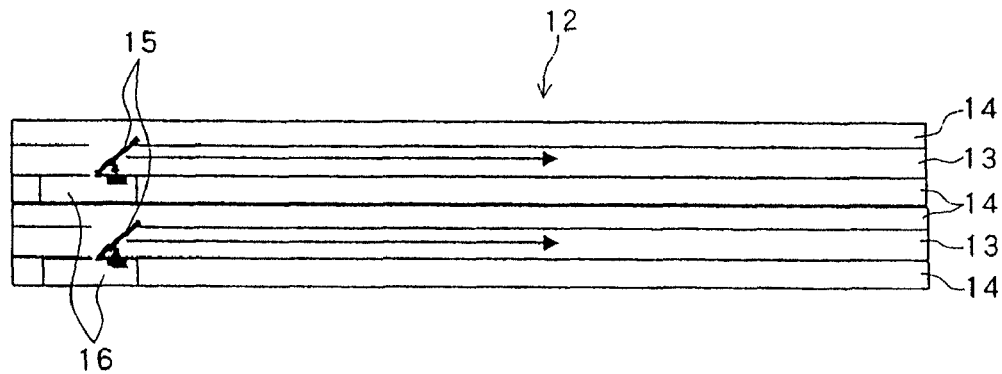

FIGS. 17A and 17B show structures in which an optical element (e.g., VCSEL 16) is mounted in a cavity defined in an optical circuit. FIG. 17A shows a structure having optical waveguide 12 in one layer. Optical waveguides 12 may be provided in multiple layers. FIG. 17B shows a structure having optical elements embedded in each layer of optical waveguides 12 having two stacked layers. In these structures, a cavity is defined in cladding layer 14, and an optical element is mounted in the cavity, the optical element being disposed closely to and optically coupled to core 13 of optical waveguide 12 by mirror 15. The optical element and the core 13 are optically coupled highly efficiently with each other because the optical distance between the light-emitting surface of the optical element and core 13 of optical waveguide 12 is essentially nil.

In these structures, the point of light emission is positioned closely to an end of the optical element (the right end of the optical element in FIGS. 17A and 17B), and when core 13 of optical waveguide 12 and the optical element are coupled to each other, core 13 of optical waveguide 12 is covered with cladding 14 in a region where the light beam is propagated through optical waveguide 12. Core 13 of optical waveguide 12 has a refractive index of about 1.5 which is smaller than the refractive index of about 3 of the optical element. Therefore, in the region other than the region where core 13 of optical waveguide 12 and the optical element are optical coupled to each other, the light beam is propagated well as core 13 of optical waveguide 12 and optical element are not held in contact with each other.

Calculations will be made with respect to a specific example in which cladding layer 14 of optical waveguide 12 has a thickness of 25 μm and core layer 13 thereof has a thickness of 50 μm. In the structure in which no cavity is defined in optical waveguide 12, as shown in FIG. 3, the distance from the optical element to the center of core 13 of optical waveguide 12 is 50 μm (the thickness of the cladding layer: 25 μm+one-half of the thickness of the core: 25 μm). In the structures shown in FIGS. 17A and 17B, the distance from the optical element to the center of core 13 of optical waveguide 12 is 25 μm. If the optical element is a VSCEL having a light emission diameter of 10 μm and a full light spreading angle of 20°, then the light beam diameter at the center of core 13 is 28 μm for the structure shown in FIG. 3 and 19 μm for the structures shown in FIGS. 17A and 17B. Since the cavity defined in optical waveguide 12 is effective to reduce the light beam diameter at the center of core 13 by 9 μm (=28 μm−19 μm), optical coupling efficiency is prevented from being lowered even if parts are positionally displaced. With the optical element being incorporated in optical waveguide 12, the overall thickness of the junction structure is reduced.

Exemplary Embodiment 7

Figure 18:
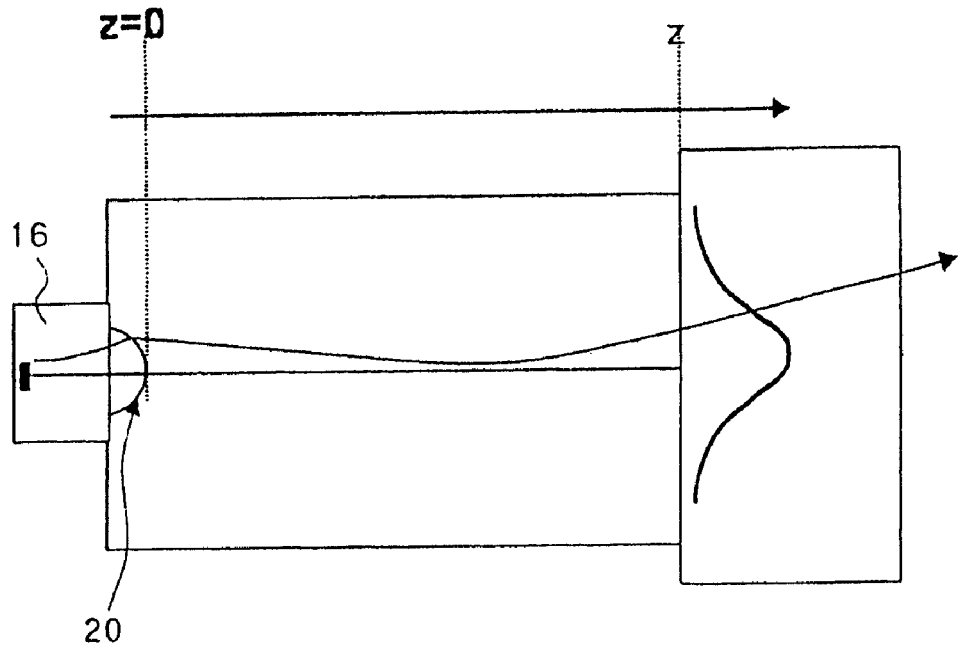

FIG. 18 shows an exemplary embodiment wherein lens 20 is integrated on the light exit surface of VCSEL 16. If lens 20 having a refractive index n, a thickness of 120 μm, and a radius R of curvature is disposed on the surface of VCSEL 16, then the spot size W at a point that is spaced distance z from the surface of lens 20 is calculated and analyzed, provided that spot size $W_o$ of the light beam emitted from VCSEL 16 at the point of light emission is 1.5 μm. The region at propagated distance z is a location that is transverse to the multilayer waveguides, and is considered to be filled up with a material having a refractive index $n_1$ of 1.6. Actually, the region is a place where cores 13 and claddings 14 whose refractive index difference is about 1% or 2% are stacked in multiple layers. Since the refractive index difference is small, their refractive indexes are averaged to be $n_1$=1.6. The refractive index of lens 20 is 3.5 which is the refractive index of GaAs.

Figure 19:
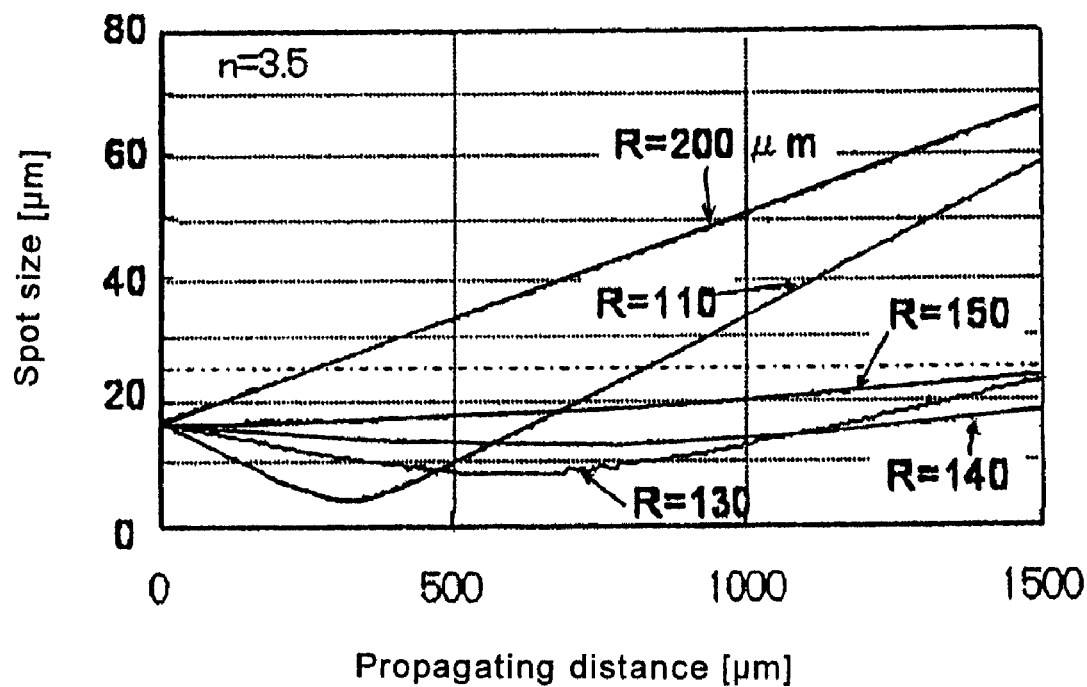

FIG. 19 shows the results of the analysis using the radius R of curvature of the lens as a parameter. If R is large (e.g., R=200 μm), then since the convergent power is small, the spot size W monotonously increases in tandem with the propagated distance z. If R is small (e.g., R=110 μm), then the convergent power is so strong that the beam is constricted and then spread greatly. If R is of an appropriate value (R=130 μm-150 μm), then convergence by lens 20 and spreading of the beam in the uniform medium are appropriately balanced and the spot size W almost remains unchanged over a long distance z. If core 13 of optical waveguide 12 has a diameter of 50 μm, then the spot size W which produces a coupling loss of 1 dB is 50/2×1.046=26.2 μm. If the spot size W is smaller than this value, then a good coupling can be expected. If the spot size W is too small, then caution should be exercised because a large angle component passes through cladding 14 without being fully reflected by the boundary between core 13 and cladding 14. However, substantially no problem seems to arise about such a point in the range shown in FIG. 19.

In FIG. 19, the spot size W=26.2 μm for a coupling loss of 1 dB is indicated by the dot-and-dash-line curve. If the radius R of curvature is 130 to 150 μm, then the spot size W is below the dot-and-dash-line curve (1 dB loss boundary curve) over the range z=0 to 1500 μm. Therefore, a good coupling can be expected even up to a point that is spaced a distance of 1500 μm from the surface of lens 20. In view of the fact that one layer of the optical wavelength has a thickness of 100 μm, this means that it is possible to provide a structure made up of optical waveguides stacked in 15 layers.

In each of the above exemplary embodiments, multilayer optical waveguides 12 may be manufactured by fabricating one-layer waveguides 12, positioning them highly accurately with respect to each other, and bonding them with a transparent adhesive (ultraviolet-curable adhesive or the like). Alternatively, multilayer optical waveguides 12 having a plurality of cores 13 may be fabricated together. According to the latter process, oblique micromirror 15 may be formed by cutting off, with a slanted cutting blade, multilayer optical waveguides 12 to a desired layer from the surface thereof.

Cores 13 of multilayer optical waveguides 12 do not need to be uniform in size. Core 13 of optical waveguide 12 in an upper layer, i.e., core 13 of optical waveguide 12 remote from VCSELs 16, may be larger than core 13 of optical waveguide 12 in a lower layer. Use of this structure improves coupling efficiency.

The gap between VCSELs 16 and optical waveguides 12 can be filled up with the same material as claddings 14 of optical waveguides 12, for example. This arrangement is effective to improve structural stability and optical coupling efficiency. This arrangement is applicable to a structure wherein lens 20 is disposed on the surface of VSCEL 16. However, the refractive index of the filling material needs to be smaller than the refractive index of lens 20. If the refractive index of lens 20 is 3.5 which is the refractive index of GaAs, then a polymer having a refractive index of 1.5 is suitable for use as the filling material.

According to the present invention, a number of optical elements do not need to be arranged in a special layout shaped as a parallelogram or the like, as is the case with Japanese laid-open patent publication No. 2004-198579, for example, but may be arranged in a layout shaped as a square. Therefore, the optical elements can be arranged most efficiently with no gaps therebetween, and can be reduced in overall size, thereby reducing the size of an optical coupling between the optical elements and the optical circuit. If the optical elements are arranged in a special layout shaped as a parallelogram or the like, then the number of rows and the number of columns are constant. If optical elements in a different number of rows or in a different number of columns are required, then it is necessary to design and fabricate optical elements completely differently. According to the present invention, since the optical elements can be arranged in a layout shaped as a square, the number of rows and the number of columns can be easily increased. For example, optical elements in 100 rows×100 columns may be fabricated on a wafer, and may be diced into desired sizes for use.

According to a structure disclosed in Japanese laid-open patent publication No. 2003-114365, the number of parts and assembling steps is increased and the cost of the optical coupling is high because a second optical waveguide array is inserted. According to the present invention, however, since the connection structure is constructed of only a horizontally extending optical waveguide shown in FIG. 3D, for example, the number of parts is smaller than the structure disclosed in Japanese laid-open patent publication No. 2003-114365. Because the optical element and the optical waveguide are sufficiently coupled to each other in the structure of the present invention, a sufficient optical coupling is achieved with a smaller number of parts than the structure disclosed in Japanese laid-open patent publication No. 2003-114365, resulting in a lower cost. If a common cladding is used between optical waveguides in layers as shown in FIG. 15B, then the distance between the optical elements and the cores of the optical waveguides can be reduced, with the result that the coupling loss can be reduced.

Optical circuits (optical waveguides) are formed on a printed board with chips such as LSI chips mounted thereon. The number of optical circuits (optical waveguides) may be in the range from 100 to 1000 (100 to 1000 channels), and a signal may be transmitted through each of the optical circuits (optical waveguides) at a rate of 10 Gb/s (Gigabits per second).

According to the present invention, oblique micromirrors may be formed in optical waveguides to bend light beams, thereby providing a connection structure including low-profile optical waveguides parallel to the substrate.

By appropriately setting relative positions and angles of a two-dimensional array of optical elements (light sources or photodetectors) and an array of optical waveguides, the optical elements in the two-dimensional array can be optically connected by the array of optical waveguides in one layer. Specifically, the array of optical waveguides is inclined to the two-dimensional array of optical elements, and the optical waveguides are arranged to extend between the optical elements to realize a two-dimensional connection and to increase the parallelism by several times a one-dimensional array of optical elements.

By stacking optical waveguides in their thickness direction to make a multilayer structure and providing micromirrors in the respective optical waveguides, two-dimensional optical connections can be realized. The optical waveguides in each layer are aligned with the optical elements in one row of the array. The parallelism is represented by the number of optical elements in one row×the number of layers. If optical waveguides are stacked in more layers, then the number of parallel transmission paths can be increased by inclining the optical waveguides to the array of optical elements in alternately opposite directions.

If micromirrors are disposed in the optical waveguides in a two-dimensional array at respective positions that are aligned with the optical elements, the distance between the optical elements and the optical waveguides is made smaller for increased coupling efficiency than if a common mirror is provided for all the optical waveguides in multiple layers. As described above, optical waveguides are inclined to the grids of an optical element array that is arranged in a grid-like pattern (two-dimensional array), and micromirrors are provided in the optical waveguides at respective positions aligned with the optical elements at the grid points, thereby achieving two-dimensional optical connections with an array of optical waveguides in one layer. Parallelism of structure can be 3 to 5 times larger than that of the conventional one-dimensional array. Further, this structure may be stacked in multiple stages to provide parallelism which is 3 to 5 times, i.e., 10 times or more the conventional one-dimensional array.

If the array of optical waveguides is not inclined to the grids of the optical element array, then the first row of the two-dimensional array of optical elements is combined with the first layer of the optical waveguide array, and the second row of the two-dimensional array of optical elements is combined with the second layer of the optical waveguide array. By integrating lenses in the optical element array, this arrangement is also effective to achieve parallelism which is 10 times or more the conventional one-dimensional array.

The invention claimed is:

1. A connection structure comprising:
a two-dimensional array of optical elements including a plurality of rows and a plurality of columns;
optical circuits corresponding to the two-dimensional array of optical elements; and
a mirror for optically connecting said optical circuits to said two-dimensional array of optical elements, respectively,
wherein:
a first plane including the two-dimensional array of optical elements is substantially parallel to a second plane including the optical circuits,
an entire length of the optical circuits in the second plane is inclined to both the plurality of rows and the plurality of columns of the two-dimensional array of optical elements, and
said optical circuits are disposed on a surface of a substrate in which said two-dimensional array of optical elements is embedded.

2. The connection structure according to claim 1, wherein said optical circuits construct a single layer.

3. A connection structure comprising:
a two-dimensional array of optical elements including a plurality of rows and a plurality of columns;
a plurality of optical circuits stacked in multiple layers; and
a plurality of mirrors disposed respectively in said optical circuits in the multiple layers and optically coupled to said two-dimensional array of optical elements,
wherein:
a first plane including the two-dimensional array of optical elements is substantially parallel to a second plane including a first plurality of optical circuits from among the plurality of optical circuits,
an entire length of the optical circuits in the second plane is inclined to both the plurality of rows and the plurality of columns of the two-dimensional array of optical elements, and said optical circuits are disposed on a surface of a substrate in which said two-dimensional array of optical elements is embedded.

4. A connection structure comprising:
a two-dimensional array of optical elements including a plurality of rows and a plurality of columns;
optical circuits corresponding to the two-dimensional array of optical elements; and
a mirror for optically connecting said optical circuits to said two-dimensional array of optical elements, respectively,
wherein:
a first plane including the two-dimensional array of optical elements is substantially parallel to a second plane including the optical circuits,
an entire length of the optical circuits in the second plane is inclined to both the plurality of rows and the plurality of columns of the two-dimensional array of optical elements,
said two-dimensional array of optical elements are mounted in cavities defined in said optical circuits, and
the first plane is same as the second plane.

5. The connection structure according to claim 4, wherein said optical circuits construct a single layer.

6. A connection structure comprising:
a two-dimensional array of optical elements including a plurality of rows and a plurality of columns;
a plurality of optical circuits stacked in multiple layers; and
a plurality of mirrors disposed respectively in said optical circuits in the multiple layers and optically coupled to said two-dimensional array of optical elements,
wherein:
a first plane including the two-dimensional array of optical elements is substantially parallel to a second plane including a first plurality of optical circuits from among the plurality of optical circuits, and
an entire length of the optical circuits in the second plane is inclined to both the plurality of rows and the plurality of columns of the two-dimensional array of optical elements,
said two-dimensional array of optical elements are mounted in cavities defined in said optical circuits, and
the first plane is same as the second plane.

* * * * *